(12) United States Patent
Monjardo

(10) Patent No.: US 11,331,944 B1
(45) Date of Patent: May 17, 2022

(54) PRODUCT HAVING PRISMATIC EFFECT AND METHOD OF PRODUCING THEREOF

(71) Applicant: Tajine Monjardo, Great Barrington, MA (US)

(72) Inventor: Tajine Monjardo, Great Barrington, MA (US)

( * ) Notice: Subject to any disclaimer, the term of this patent is extended or adjusted under 35 U.S.C. 154(b) by 143 days.

(21) Appl. No.: 16/573,690

(22) Filed: Sep. 17, 2019

(51) Int. Cl.
| | | |
|---|---|---|
| *B44F 1/02* | (2006.01) | |
| *B44C 1/22* | (2006.01) | |
| *B05D 5/06* | (2006.01) | |
| *B05D 3/12* | (2006.01) | |
| *C09D 5/29* | (2006.01) | |
| *B32B 3/30* | (2006.01) | |
| *B44F 1/14* | (2006.01) | |

(52) U.S. Cl.
CPC ............... *B44F 1/02* (2013.01); *B05D 3/12* (2013.01); *B05D 5/061* (2013.01); *B32B 3/30* (2013.01); *B44C 1/222* (2013.01); *B44F 1/14* (2013.01); *C09D 5/29* (2013.01); *Y10T 428/24355* (2015.01); *Y10T 428/24479* (2015.01)

(58) Field of Classification Search
CPC .. B05D 5/061; B05D 3/12; B32B 3/30; B32B 27/38; B32B 2363/00; B32B 2333/12; B32B 27/308; G02B 5/021; G02B 5/0231; G02B 5/045; G02B 5/32; C09D 5/29; C09D 163/00; Y10T 428/24479; Y10T 428/24355; B44F 1/04; B44F 1/06; B44F 1/063; B44F 1/066; B44F 1/08; B44F 1/00; B44F 1/14; B44F 1/02
See application file for complete search history.

(56) References Cited

U.S. PATENT DOCUMENTS

| | | | | |
|---|---|---|---|---|
| 6,383,613 | B1 * | 5/2002 | Takeda | B32B 3/30 428/195.1 |
| 2008/0145661 | A1 * | 6/2008 | Medwick | C03C 19/00 428/409 |
| 2013/0280487 | A1 * | 10/2013 | Blazy | B32B 17/10247 428/142 |
| 2016/0325535 | A1 * | 11/2016 | Ueno | B32B 27/36 |
| 2017/0217123 | A1 * | 8/2017 | Kataoka | B32B 27/00 |
| 2018/0180781 | A1 * | 6/2018 | Yasuda | G02B 5/1861 |
| 2019/0291504 | A1 * | 9/2019 | Cho | B32B 33/00 |

OTHER PUBLICATIONS

DIY Countertop Epoxy. https://web.archive.org/web/20180915165916/https://epoxycountertopdiy.com/. Sep. 15, 2018. (Year: 2018).*
https://www.instagram.com/p/BdVlnT1DWGn/?utm_source=ig_web_copy_link; published Dec. 30, 2017. accessed May 7, 2021 (Year: 2017).*

(Continued)

*Primary Examiner* — Nancy R Johnson
(74) *Attorney, Agent, or Firm* — Pryor Cashman LLP

(57) ABSTRACT

A workpiece composed of acrylic material can be modified to produce a highly visual and aesthetic prismatic effect in which white light entering the workpiece can exit the workpiece in separate colors and sets. By applying dichroic paint and primer to precision cuts made into one of the planar surfaces of the workpiece, preferably filling in the spaces with a resin epoxy and then preferably sanding the surface, many more colors can be generated by the white light exiting the workpiece.

12 Claims, 15 Drawing Sheets

(56) References Cited

OTHER PUBLICATIONS https://www.instagram.com/p/BfzccR2jTnD/?utm_source=ig_web_copy_link; published Mar. 1, 2018; accessed May 7, 2021 (Year: 2018).* https://www.instagram.com/p/Bg7muVhDTqv/?utm_source=ig_web_copy_link; published Mar. 29, 2018; accessed May 7, 2021 (Year: 2018).* https://www.instagram.com/p/BfyWTFtjKAb/?utm_source=ig_web_copy_link; published Mar. 1, 2018; accessed May 7, 2021 (Year: 2018).* https://www.instagram.com/p/BMxTgCKhYTk/?utm_source=ig_web_copy_link; published Nov. 13, 2016; accessed May 7, 2021 (Year: 2016).*

"Color-changing furniture pieces are painted by hand." by Shannon Murphy and Daniel Gessner; https://www.insider.com/color-changing-furniture-multichrome-paint-2019-11; published Dec. 2, 2019; accessed May 7, 2021 (Year: 2019).*

* cited by examiner

| First Color Set | Second Color Set | Third Color Set |
|---|---|---|
| Red | Pink | Olive |
| Orange | Gold | Saffron |
| Yellow | Vermilion | Cerulean |
| Green | Cinnabar | Lavender |
| Blue | Dandelion | Cyan |
| Violet | Teal | Magenta |

Fig. 13A

| First Color Set | Second Color Set | Third Color Set |
|---|---|---|
| Red | Red | Red |
| Orange | Gold | Saffron |
| Yellow | Vermilion | Vermilion |
| Green | Cinnabar | Lavender |
| Blue | Dandelion | Cyan |
| Violet | Violet | Magenta |

Fig. 13B

| Direction/Angle | First Color Set | Second Color Set | Third Color Set |
|---|---|---|---|
| 1st | Red | Pink | Dandelion |
| 2nd | Red | Pink | Saffron |
| 3rd | Blue | Lavender | Cyan |
| 4th | Blue | Lavender | Gold |
| 5th | Blue | Lavender | Dandelion |
| 6th | Blue | Magenta | Dandelion |

Fig. 13C

| Visible Light Spectrum ||
|---|---|
| Color | Frequency (Hz) |
| Red | $3.84 \times 10^{14} - 4.82 \times 10^{14}$ |
| Orange | $4.82 \times 10^{14} - 5.03 \times 10^{14}$ |
| Yellow | $5.03 \times 10^{14} - 5.20 \times 10^{14}$ |
| Green | $5.20 \times 10^{14} - 6.10 \times 10^{14}$ |
| Blue | $6.10 \times 10^{14} - 6.59 \times 10^{14}$ |
| Violet | $6.59 \times 10^{14} - 7.69 \times 10^{14}$ |

Fig. 14

| Poly(methyl methacrylate) (Acrylic) Properties ||
|---|---|
| Chemical Formula | $(C_5O_2H_8)_n$, n = 1, 2, 3 ... $\infty$ |
| Density | $1.18$ g/cm$^3$ |
| Melting Point | 320 F° (433 K) |
| Magnetic Susceptibility | $-9.06 \times 10^{-6}$ |
| Refractive Index | 1.4905 at 589.3 nm |

Fig. 15

PRODUCT HAVING PRISMATIC EFFECT AND METHOD OF PRODUCING THEREOF

TECHNICAL FIELD

The present application relates to a product, preferably a household product, like a coffee table, an end table, a dining room table, a wing of an auto, a hand grip, a guitar body, etc. having a prismatic visual effect and a method of producing such a product, in particular, the prismatic effect is caused by making carvings in a workpiece comprising acrylic material and coating and filling in the carvings, according to the process set forth herein.

BACKGROUND

While the invention is primarily directed to a table top surface, the end product of the method disclosed herein may have a range of other functions. The end product may take a wide variety of forms, for example, it can be the base of a guitar, a gull wing for an automobile, a hand grip, etc. In any event, for ease of illustration the present invention will be focused upon and be described with respect to the making of a table top surface. However, it will be appreciated that other forms and end products can be made according to the steps and structure of the disclosed invention. In order to basically understand the invention and the disclosed process, it is important to understand some basic elements of physics and light wave technology. Electromagnetic radiation is composed of waves of electromagnetic fields that propagate through space. Such electromagnetic radiation can be classified on an electromagnetic spectrum based on frequency and/or wavelength. Visible light which is a portion of the electromagnetic radiation on the electromagnetic spectrum that is visible to the human eye has a frequency range of $3.84 \times 10^{14}$-$7.69 \times 10^{14}$ Hz (wavelength: 380 nm-740 nm). Although the term "light" may sometimes refer to electromagnetic radiation of any frequency and/or wavelength (e.g., radio waves, microwaves, ultraviolet, x-rays, gamma rays, etc.), the term "light" used herein refers to any portion of human visible light (i.e. light that is visible to the human eye) within the electromagnetic spectrum.

In addition to having particle characteristics, light includes wave characteristics as well. Thus, different wavelengths of light generate different colors when perceived by the human eye, retina, optic nerve and brain, which creates a visible light spectrum, as shown in FIG. 14. White light is generated by combining all of the wavelengths of visible light (i.e. superposition). As such, by using an optical, light separating element, such as a crystalline prism, the wavelengths of white light can be separated to see and/or "obtain" the different colors that compose white light, as basically shown in FIG. 14. A prism is an optical element that includes surfaces which cause light entering the prism to be separated and thus individually visible by color upon exiting another side or surface of the prism. Such separation is caused by the fact that the different colors (corresponding to different wavelengths) of light travel at different speeds in a solid. As a result, refraction by the action of the white light passing through the prism, causes the differing wavelengths of light to be deflected at different angular amounts which results in separated colors emanating from a surface of the prism opposed to the surface which is used for the light to enter the prism. Thus, optical elements that are able to angularly separate light by color can be said to have a prismatic or multi-chromatic effect. This is usually quite appealing and is a key feature of the present invention.

SUMMARY

In general, in one aspect, exemplary embodiments of the present invention provide a method for creating a prismatic device, a table or other planar component or apparatus, the method comprising (a) providing a workpiece of acrylic material having a basically planar first side and a parallel and basically initially planar second side, and (b) carving one or more portions of the first side of the workpiece so as to create one or more substantially flawless cuts that are capable of producing a visual prismatic effect. Then, the indentation caused by the cuts are coated with a coat of dichromic paint and then that surface further coated with a coat of primer. Then, the indentations or cuts (coated with the dichromic paint and primer layers) are raised to be flush with the rest of the planar surface by the use of resin filling in the same. Implementations of the various exemplary embodiments of the present application may include one or more of the following features. The method further comprises (c) applying a dichromatic or dichroic coating to the first side of the workpiece to create a dichroic coating layer after the one or more flawless cuts have been created in (b). The method also comprises (d) applying a coating of primer to the dichroic coating layer to create a primer layer. The method also comprises the preferred but not required (e) applying epoxy resin onto the primer layer to create an epoxy resin protective layer such that the epoxy resin fills in a gap or opening of the one or more flawless cuts so as to create a substantially flat or planar surface on the first side of the workpiece. That serves to protect the primer which is on top of the layer of the dichroic paint. The method also comprises the suggested addition of a step of (f) polishing the first side and second sides of the workpiece after applying the epoxy resin to the primer layer in (e). The one or more flawless cuts can preferably include a V-shaped cross-section, a U-shaped cross-section, and/or a square-shaped cross-section. Other combinations and cross sections can be cut, too, into the one or other layer of the acrylic. Further, the one or more flawless cuts are made using a high speed drill bit of a drill. Preferably the cuts are made by a CNC machine. In addition, the workpiece can be initially substantially or all transparent and substantially flat although curves can be present, on the sides and/or at sections of the otherwise planar surfaces, too.

In general, in another aspect, exemplary embodiments of the present invention provide a prismatic end product prepared by a method comprising (a) providing an acrylic-based workpiece having a first planar side and a basically planar second side, and (b) carving one or more portions of the first side of the workpiece so as to create one or more substantially flawless cuts that are capable of producing a prismatic visual effect. Implementations of the various exemplary embodiments of the present application may include one or more of the following features. The method further comprises (c) applying a dichroic paint-like coating to the first and now cut side of the workpiece to create a dichroic coating layer after the one or more flawless cuts have been created in (b). The method also comprises (d) applying primer on top of and to the dichroic coating layer to create a primer layer. The method preferably but not necessarily also comprises (e) applying epoxy resin onto the primer layer to create an epoxy resin layer such that the epoxy resin is not merely a thin layer (like the paint and primer) but, rather, volumetrically fills in any opening and/or gap of the one or more flawless cuts so as to create a substantially flat surface on the first side of the workpiece. The method also preferably but not necessarily comprises (f) polishing the first side and/or second sides of the workpiece after applying the epoxy resin to the primer layer in (e). The one or more flawless cuts can include a V-shaped cross-section, a U-shaped cross-section, and/or a square-shaped cross-section. Further, the one or more substantially flawless cuts are made using a drill bit of a drill, preferably controlled by a CNC machine. In addition, the workpiece can be transparent and substantially flat. An amazing visual effect is thus created.

BRIEF DESCRIPTION OF THE DRAWINGS

The aforementioned and other aspects, features and advantages can be more readily understood from the following detailed description with reference to the accompanying drawings wherein:

FIGS. 13A-13C show Tables classifying the colors produced and made visible by a workpiece made in accordance with any one of the embodiments illustrated in FIGS. 8-12;

FIG. 14 shows a Table classifying the colors of the visible spectrum according to frequency; and FIG. 15 shows a Table presenting many of the properties of poly(methyl methacrylate) also known as acrylic-the basic material used for the planar surface of the present invention, preferably a table.

DETAILED DESCRIPTION OF THE PREFERRED EMBODIMENTS AND FIGURES

Figure 1:
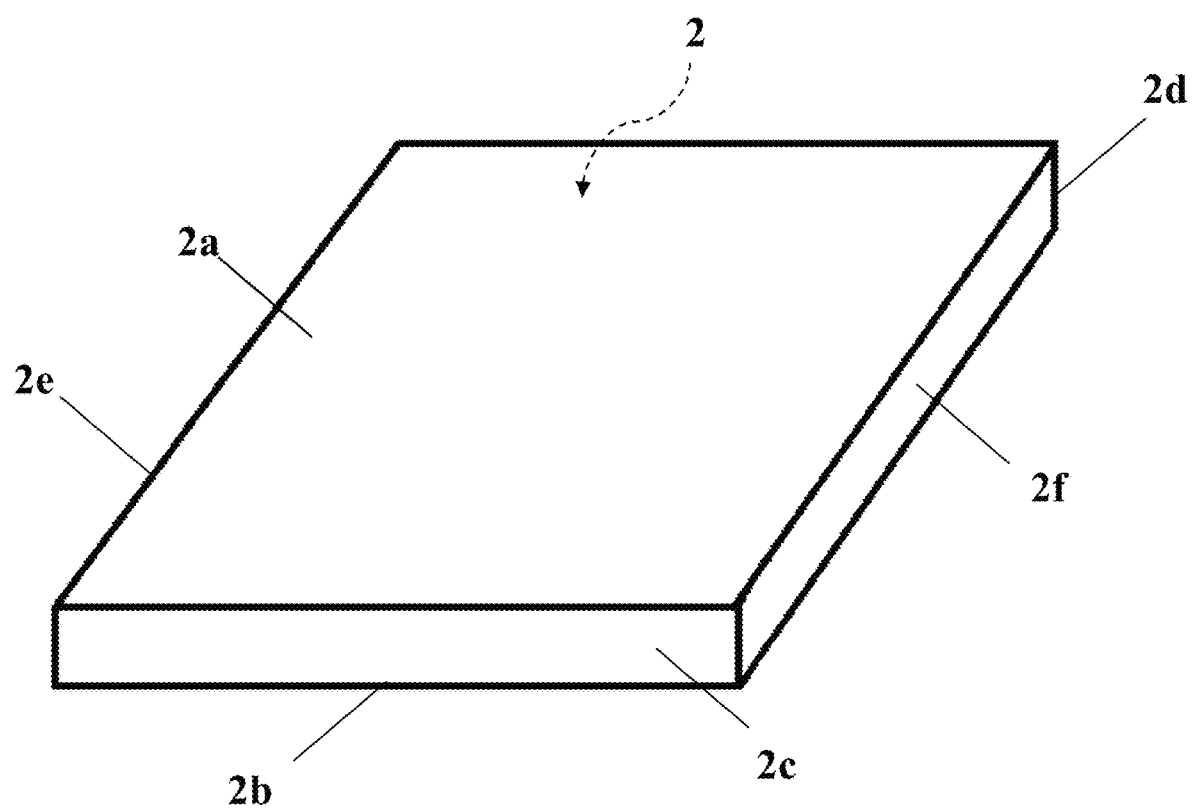
FIG. 1 shows an initial and blank, acrylic and opposed planar surfaced workpiece, according to an embodiment of the present disclosure.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate or work in a similar manner. In addition, a detailed description of known functions and configurations are omitted from this specification when it may obscure the inventive aspects described herein, it being understood that certain aspects are clearly understood by those of ordinary skill in the art.

Various tools and methods to facilitate producing a product having a prismatic visual effect are disclosed herein. It should be appreciated by those skilled in the art that any one or more of such tools or methods may be used to produce a product having a desired and visually distinct prismatic effect and/or in any of various other ways, and thus while various examples are discussed herein, the inventive aspects of this disclosure are not limited to such examples herein.

Referring now to the drawings, wherein like reference numerals designate identical or corresponding parts throughout the several views, FIG. 1 shows a planar, preferably acrylic, workpiece 2 intended to be shaped into a table top, whether a simple square or rectangular shape, circular, oval, hexagon, or free form. The workpiece 2 includes a first substantially planar side 2a, and a second, opposed and substantially planar and mostly parallel side 2b. The workpiece can be of any perimeter shape or contour but, for ease of illustration, a rectangular workpiece with vertical side wall edges, perpendicular to one another is shown and described. Of course, other shapes can be made. Edges are defined as first long wall edge 2c and opposed edge 2d, along with opposing short wall edges 2e and 2f. The first side or planar surface 2a is opposite, parallel and basically planar with and to the second, opposed, substantially flat or planar side 2b. The long wall edge 2c is opposite the opposed long wall edge 2d. The fifth side or short wall edge 2e is opposite the sixth side or short wall edge 2f. The workpiece 2 may be in any shape and/or size but, for ease of illustration, a workpiece corresponding to a desired table top, like a dining room table or a coffee table or end table is desired. It can have curves instead of perpendicular edges, too. But, it needs to be substantially planar for the first and second large top and bottom or surfaces, 2a and 2b. For example, the workpiece 2 in the present embodiment is substantially flat. The workpiece 2 may be entirely or substantially composed of poly (methyl methacrylate) (PMMA), also known as acrylic, acrylic glass or plexiglass, which is a transparent thermoplastic that is light weight and shatter resistant. Properties of acrylic are shown in FIG. 15. In an exemplary embodiment, the workpiece 2 may be cast acrylic, which is formed by casting the monomer, methyl methacrylate, with radical initiators into a form or mold. The workpiece 2 may be substantially transparent such that a person can view objects behind the workpiece 2 (i.e. see-through) without significant distortion. In other words, the original workpiece 2 may allow electromagnetic radiation, such as visible light, to pass through and be substantially undistorted. Some pieces of acrylic have a translucent or filtering effect and that can also form the basis of the workpiece 2.

Figure 2:
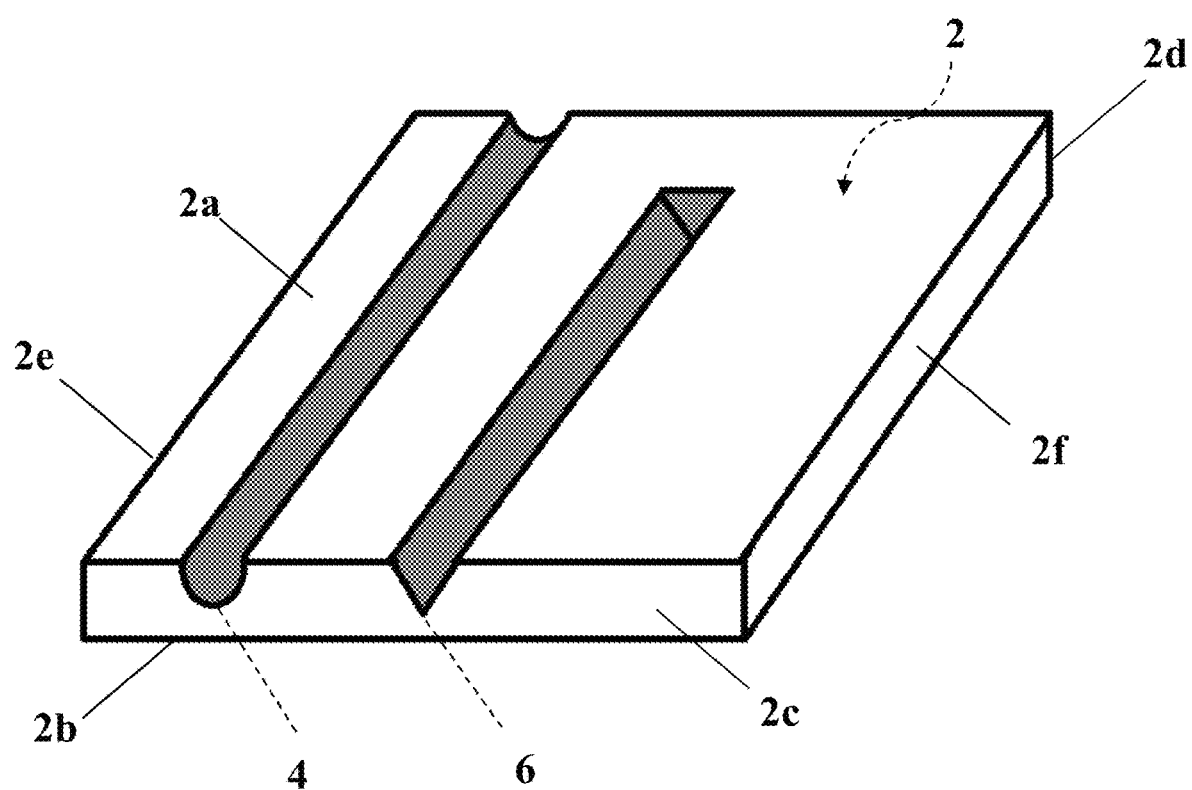
FIG. 2 shows a workpiece, according to an embodiment of the present disclosure, after one or more grooves are cut therein by a high speed drill.

Conventionally, flat and basically planar pieces of acrylic material do not have a prismatic effect. As stated previously, acrylic material is transparent such that a person can see through acrylic material. As such, this property of acrylic applies to the workpiece 2 as well in a case in which the workpiece 2 is made entirely or substantially of acrylic. However, by making precise carvings, drillings and/or cuts in one or the other flat surface of the workpiece 2 so as to produce flawless cuts 4, 6, as illustrated in FIG. 2, a prismatic effect can be produced in the area of the substantially flawless cuts 4, 6. In other words, the acrylic workpiece 2 can be transformed to produce a visually appreciative prismatic effect. In the present embodiment, the flawless cuts 4 are U-shaped cuts on the first side 2a that do extend toward but not through and to the second side 2b. However, the flawless cuts 4 extend from the third side 2c to the fourth side 2d. In contrast, the flawless cut 6 is a V-shaped cut that also does not extend through the planar surfaces 2a and 2b, but only from one planar surface 2a toward the second side 2b and it also does extends from one side edge 2c but not fully through and to the fourth side 2d.

The flawless cuts 4, 6 shown in FIG. 2 are merely exemplary. As such, a skilled artisan would recognize that the workpiece 2 can include sharp, substantially flawless cuts that constitute a through-hole (e.g., a hole that bores completely from the first side 2a through and to the second side 2b of the workpiece 2) or a combination of through-holes and blind holes. While the terms hole, through-hole and blind hole can be used to describe the flawless cuts, such flawless cuts may not necessarily be circular. Instead, such flawless cut can be any shape, depth, cross-section or size. For example, in the present embodiment, the flawless cuts 6 is a longitudinal depression whose width tapers towards a bottom of the depression thereby creating a V-shaped cross-section. Likewise, a skilled artisan would recognize that other cross-sections (square-shaped, rectangle-shaped, inverted pyramids, etc.) are also possible substitutions. A single workpiece 2 can have one or more of these flawless cuts alone or in combination. Preferably, the cuts are made with a high speed drilling machine or by hand, but the precision of a CNC milling machine is highly preferable to the end product's highly artistic and uniform aesthetic look. Drill bits of many sizes and configurations can be used to produce a workpiece 2 with many substantially flawless cuts into one of the planar surfaces.

Figure 3A:
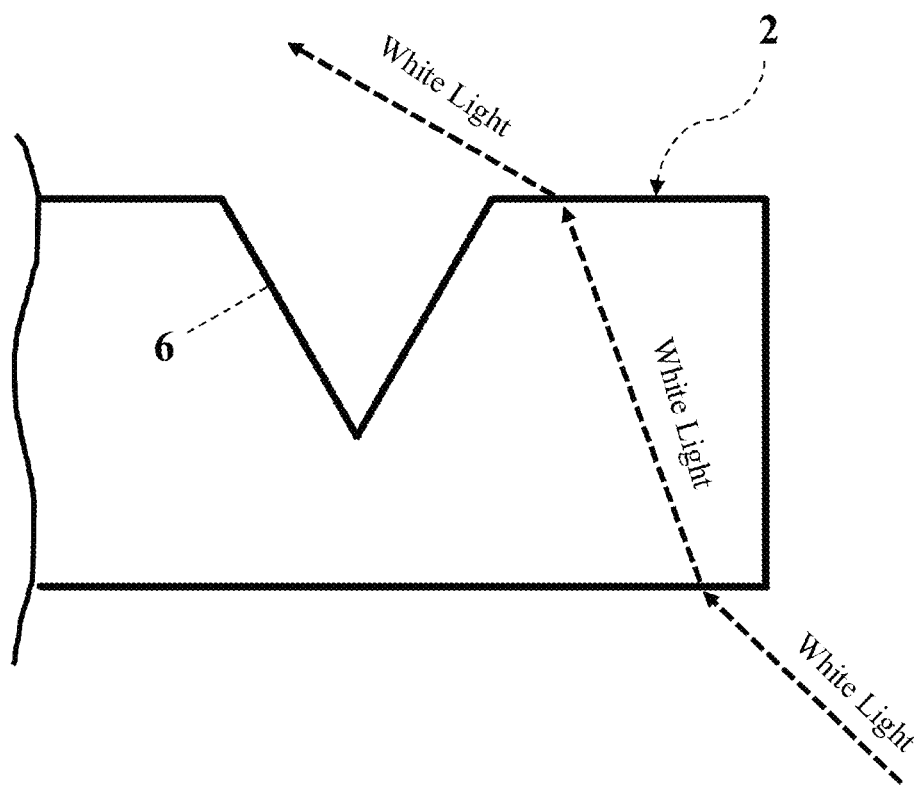
FIG. 3A-3B show paths of white light entering and exiting the opposed planar surfaces of the non-cut workpiece.
Figure 3B:
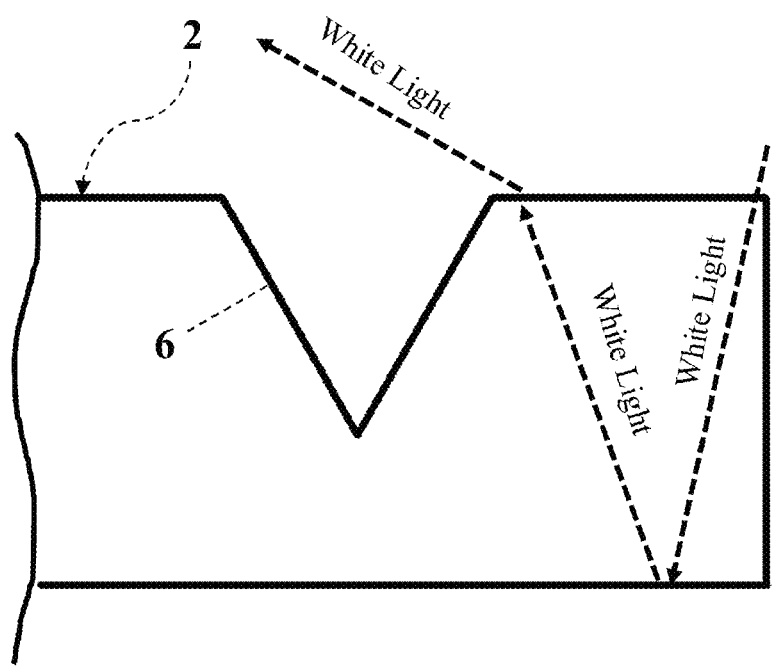
Figure 4:
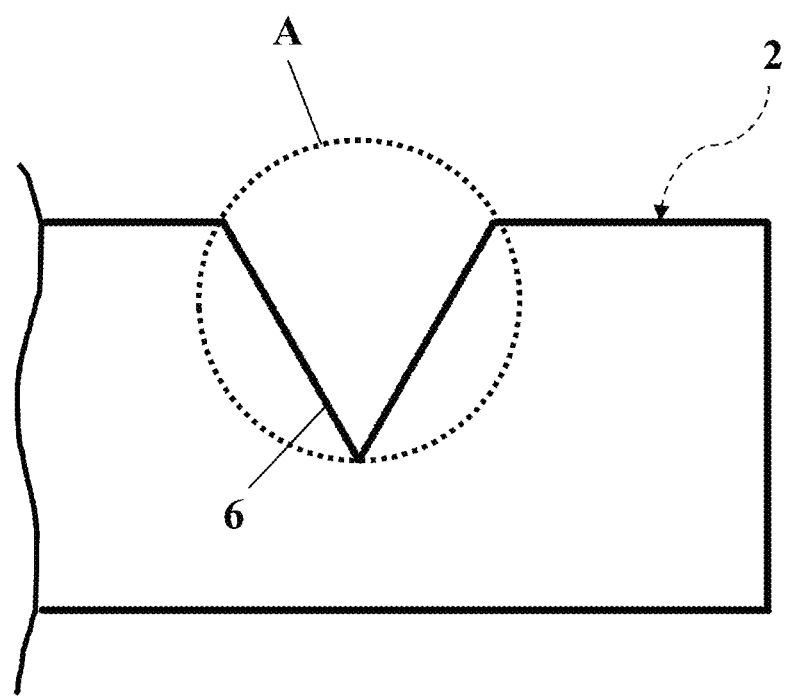
FIG. 4 shows the area of the workpiece, with opposed planar surfaces and a groove cut therein, in which white light entering the workpiece can separate and exit as a spectrum of different colored visual lights.
Figure 5A:
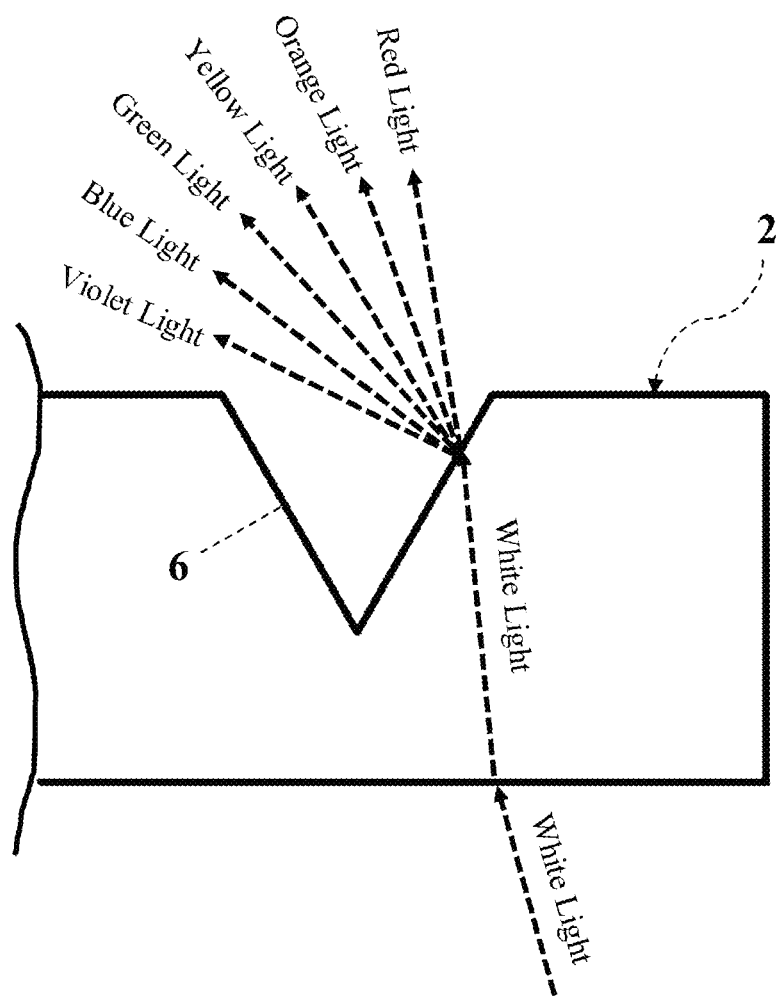
FIGS. 5A-5B show paths of white light entering the workpiece, before any dichroic coating or primer are applied, and its opposed and planar surfaces, with some of the light leaving the workpiece at the groove cut therein, with the light exiting as a spectrum of visual different colored light.
Figure 5B:
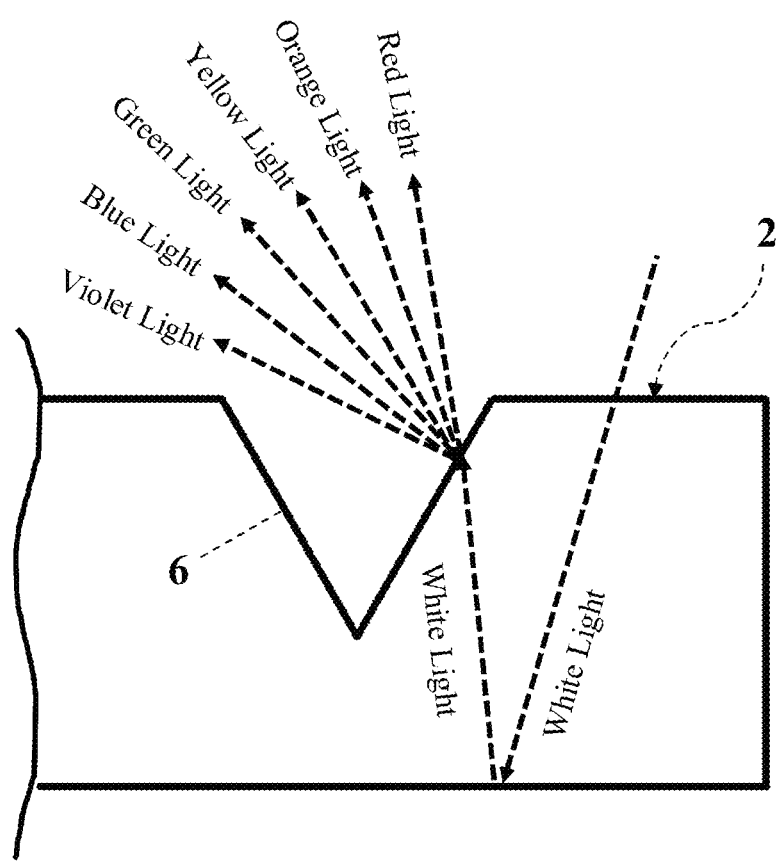

FIGS. 3A-5B illustrate different scenarios in which white light enters the workpiece 2 from one planar side after the flawless cuts 6 have been made into one of the planar surfaces of the workpiece 2. Note, that the refractions shown in FIGS. 3A-5B are exaggerated or enlarged for clearer viewing of the light path. Further, the workpiece 2 shown in FIGS. 3A-5B do not have any material such as dichroic paint or primer disposed thereon. In FIGS. 3A and 3B, when white light passes through the workpiece 2 in an area not comprising the area A as defined in FIG. 4, where the white light still exits as white light. However, when white light exits the area A which includes one or more of the flawless cuts 6, as shown in FIG. 4, a different visible result occurs. After exiting the area A of the flawless cuts 6, the white light is separated into different colors (i.e., red, orange, yellow, green, blue, violet, etc.), as shown in FIGS. 5A and 5B. In other words, depending on where the white light exits the workpiece 2 and whether or not a cut is there or not, the white light can remain as visible white light or separate into many colors. This is commonly understood to be a function of refraction and the thickness and angle of the acrylic and the cuts made into the planar surface.

The flawless cuts (e.g., 4, 6) may be made by a drill (or boring tools, lathes, etc.), which is a tool used for removing material from an object (e.g., a workpiece). Such removal may be performed through 1, 2 and 3 dimensional and rotational movement of a drill bit that is attached to the drill. The drill bit may be in any shape and/or size and made of any material (e.g., steel, tungsten carbide, etc.). Further, the drill bit may include a sharp cutting tip that cuts away at the workpiece. It is important to the end product's desired "look" that the drilling function be an end result of sharp drill bits, with substantially flawless cuts. In an exemplary embodiment, the drill may be pistol-shaped such that, at an end of the "barrel," the selected drill bit can be attached thereto. In another exemplary embodiment, the drill may be on a computer numerical control (CNC) machine that modifies the workpiece according to instructions or inputs into a computer connected to the CNC machine. As such, a workpiece can be modified through automation by instructions from a computer into the CNC machine. Alternatively, a device similar to a 3-D printer can be used with acrylic to add material to a planar surface to thereby produce a three dimensional table-like surface with one or more precision cuts into one and/or the other of the opposed planar surfaces.

A motor included in the drill or CNC machine that is powered by a battery or an electrical outlet (via an attached cable/plug combination) causes rotational and generally high speed movement to the drill bit. The spindle speed, rotation speed or revolutions per minute (RPM) may be calculated based on the frequency of rotation around an axis. In this case, the axis is considered to be concentric with the barrel of the drill. For example, the drill may have RPM in the following range: 200 RPM-25,000 RPM. Other parameters, such as feed rate, may also be utilized or programmed as instruction for the CNC machine. Feed rate is the velocity at which the cutting tip of the drill bit is advanced against the workpiece. More specifically, feed rate is the distance the cutting tip has travelled during one revolution. For example, feed rate can be measured in inches per minute. By having drill bits which are undulled and sharp, cutting at the current feed rate, cutting at the correct RPM and providing lubrications or lack thereof, the flawless cuts can be achieved such that a prismatic effect is produced into the workpiece. For example, drilling (without any lubricant) at a spindle speed (rotation speed) in the range of 9,000-18,000 RPM with a feed rate of 80-120 inches per minute, a stepover half diameter of bit (and creating a final cut depth with a 0.01 inch skim coat) results in a flawless set of cuts that can produce a prismatic effect. Generally, the drill bit is advanced along one or more of the axes of the workpiece and the drill bit is substantially perpendicular to the planar surface into which the cuts are being made.

Figure 6:
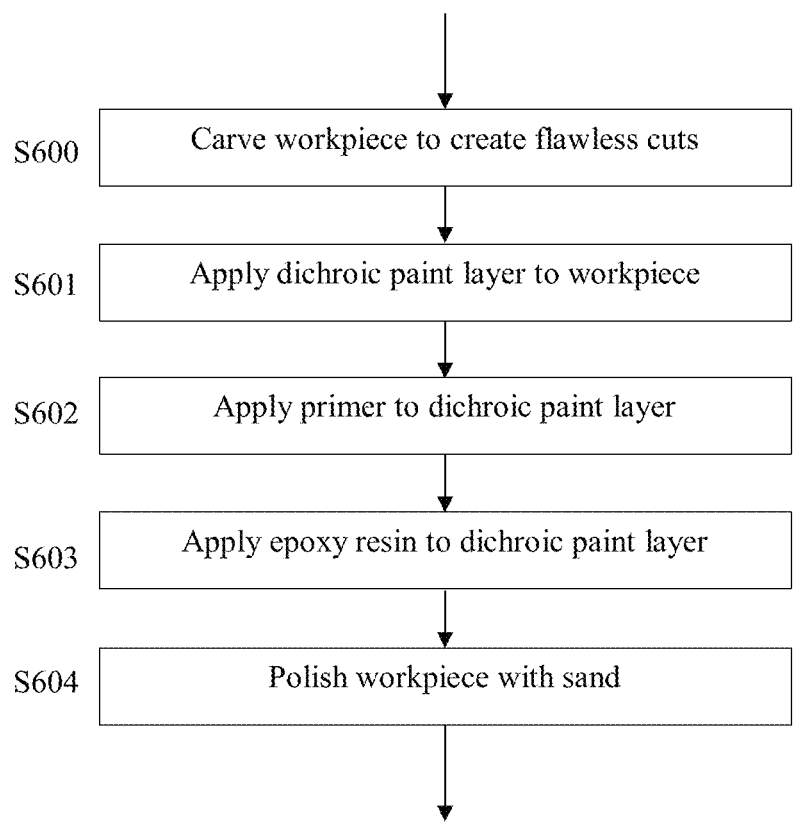
FIG. 6 shows a flow chart of a method for producing a workpiece having the desired prismatic effect.

FIG. 6 shows a simple flow chart of the process or method performed on a workpiece 8 to produce a prismatic effect on another planar workpiece 8, according to an exemplary embodiment.

Figure 7:
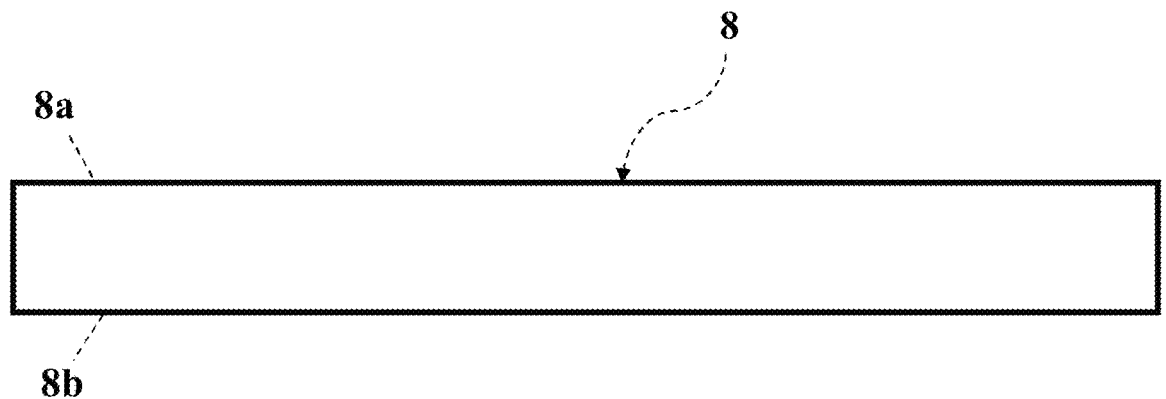
FIG. 7 shows an initial acrylic workpiece with planar opposed surfaces, according to an embodiment.
Figure 8:
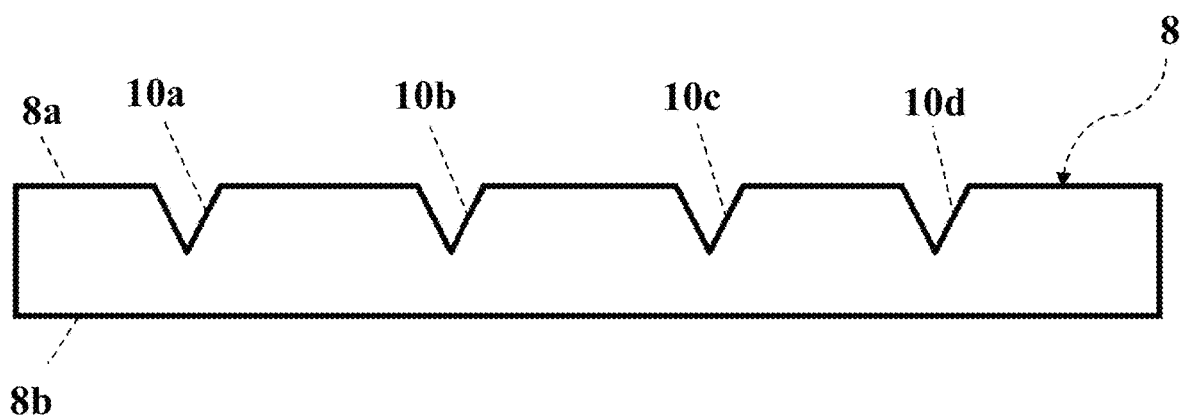
FIG. 8 shows the workpiece of FIG. 7 having carved or drilled surfaces into one of the planar surfaces so as to produce a prismatic visual effect, according to an embodiment.
Figure 9A:
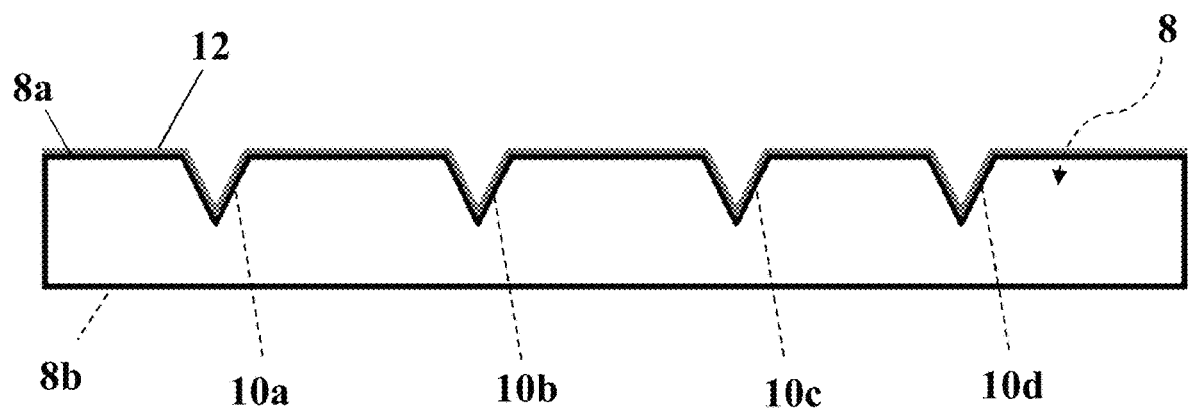
FIG. 9A shows the workpiece of FIG. 8 having a thin layer of dichroic coating or paint applied to the side or planar surface of the workpiece having the carved or drilled surfaces thereon, according to an embodiment.
Figure 9B:
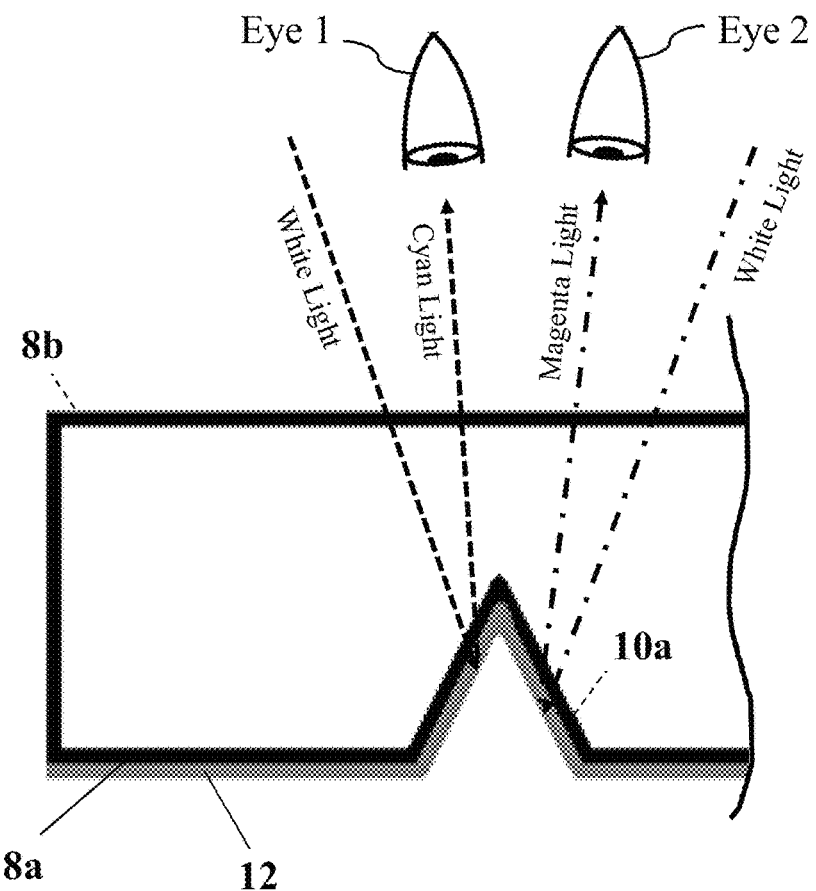
FIG. 9B shows a representative and magnified view of a section of the workpiece in FIG. 9A in which light enters and exits the workpiece.

First, the virgin and bare acrylic workpiece 8 is provided, as shown in FIG. 7, and is held down either by vacuum or mechanical force. In the present embodiment, the workpiece 8 is composed entirely or substantially of acrylic material that is formed into a substantially flat transparent sheet of opposed planar surfaces with side edges perpendicular to the planar top and bottom surfaces. The workpiece 8 includes a first top planar side 8a and a second bottom planar side 8b. In an exemplary embodiment, when a table is produced (such as, for example, the table 100 shown in FIG. 12) from the workpiece 8, the bottom planar side 8b becomes the topside of the table and the first top planar surface 8a becomes the bottom side of the table. Next, drill bits on a CNC drill are used to carve the first or top side 8a of the workpiece 8 so as to produce one or more flawless cuts 10a-10d (collectively flawless cuts 10) in this example, V-shaped grooves, within the workpiece 8 such that a prismatic effect is present in the workpiece 8 (step S600) as shown in FIG. 6. For example, the flawless cuts 10 may produce or reflect a first color set. Here the V-shaped grooves are cut from one edge to the other and parallel to one another. Such first color set may include the primary colors of the rainbow (e.g., red, orange, yellow, green, blue, indigo, violet) similar to the embodiment shown in FIGS. 5A and 5B. After carving the workpiece 8 to produce the one or more flawless cuts 10 such that a prismatic effect is evident, one or more thin layers of dichroic coating (or dichroic paint) and then a layer of primer are applied to a portion or the entire first top planar side 8a is done, as seen in FIGS. 9A and 9B. The dichroic paint and primer are carefully layered on the first top planar surface 8a (i.e. onto the drilled or carved side).

Dichroic paint is a coating that undergoes a color change depending on lighting conditions. For example, when viewing a dichroic painted-object from a first direction or angle, the dichroic painted-object may reflect (or display) light having a first color (e.g., green). In contrast, when viewing the dichroic painted-object from a second direction or angle (that is different from the first direction or angle), the dichroic painted-object may reflect (or display) light having a second distinct color (e.g., pink). In another example, when dichroic paint is applied to a front side of a flat sheet of glass, such dichroic painted-glass may display a first color (e.g., blue) when light is shone on the front side of the glass (i.e. front-lit), but may display a second and distinct color (e.g., red) when light is shone from the back side of the glass (i.e. back-lit). As such, dichroic paint is able to display a plurality of colors to a person when he or she views an object painted with dichroic paint from different directions or angles or when light is shone on the object from different directions or angles. The thin layer of dichroic paint is applied to the surface of the workpiece that has the cuts made therein and the paint is applied to both the uncut surface (the top in the example) and to the surfaces of the formed cuts, too. This is clearly seen in FIG. 9A.

Primer is a coating that is applied to material (e.g., bare metal, wood, etc.) generally before applying the paint to substantially seal the surface and to facilitate the application of the paint in a uniform coat. For example, in conventional usage, primer allows paint (e.g., automobile paint) to better adhere to metal material. Primer is often used in connection with painting sheetrock in homes, too, before paint is applied. In other words, primer can act as a bonding agent to help paint adhere more strongly to such material. Further, primer can also prevent rust and moisture damage to the underlying material. Consequently, when dichroic paint is first and conventionally second applied to primer, the primer seems to ensure better adhesion of the dichroic paint to a workpiece, increases the durability of the dichroic paint and provides additional protection for the workpiece. Conventionally, in the process for applying dichroic paint to a workpiece, the primer is applied first, then the dichroic paint and finally a clear or finishing coat. Clearcoat is a glossy and transparent coating that can be applied atop dichroic paint. As such, the clearcoat is the last layer of coating to be applied (i.e. topmost layer). Due to being the topmost layer, the clearcoat is configured to resist abrasion and to be chemically stable so as to withstand ultraviolet electromagnetic radiation.

However, in the present embodiment, the dichroic paint is applied first to the first side 8a so as to create a dichroic paint layer 12 on the workpiece 8 (step S601), as shown in FIG. 9A. In this arrangement, the dichroic paint layer 12 modifies the prismatic effect produced by the workpiece 8. For example, without the dichroic paint, the workpiece 8 may have produced or reflected the primary colors of the rainbow (e.g., red, orange, yellow, green, blue, indigo, violet). However, in the case that the workpiece 8 includes the dichroic paint layer 12, even more colors can be generated. For example, the dichroic-painted workpiece 8 may produce or reflect a second color set. Such second color set may include hues, tints or shades of the primary colors or may produce colors that include, but are not limited to, pink, gold, vermilion, cinnabar, dandelion, teal, olive, cerulean, saffron, lavender, cyan, magenta, etc. An example of a portion of the colors in the second color set is reflected in FIG. 9B, which is an enlarged and magnified view of the workpiece 8 of FIG. 9A. As illustrated in FIG. 9B, white light may enter the flawless cut 10a via the bottom side 8b. As the white light enters inside the workpiece 8, the white light becomes modified light. Next, the modified light may reach the dichroic coating layer 12. Once the modified light reaches the dichroic coating layer 12, the modified light may be reflected, such that the modified light exits the bottom side 8b of the workpiece 8 as one of the colors in the second color set. As such, the color of the light exiting the workpiece 8 (after being reflected by the dichroic layer 12) is dependent on the angle in which the white light (corresponding to the exiting light) originally entered the workpiece 8. Thus, a person (i.e. viewer) viewing the workpiece 8 from the bottom side 8b may view different colors depending on the angle from which he or she is viewing the bottom side 8b of the workpiece 8. For example, as shown in FIG. 9B, a first viewer having an eye 1 may view, from a first direction (or a first angle), cyan light exiting the workpiece 8. Similarly, a second viewer having an eye 2 may view, from a second direction (or a second angle), magenta light exiting the workpiece 8. While the example shown in FIG. 9B illustrates the dichroic painted-workpiece 8 producing magenta light and cyan light, the dichroic painted-workpiece 8 may produce other colors as well.

In one exemplary embodiment, the first color set and the second color set may include colors that are exclusive to each other, as shown in FIG. 13A. In another exemplary embodiment, there may be at least one color that is present in both the first color set and the second color set, as shown in FIG. 13C. In yet another exemplary embodiment, the shape or size of the flawless cuts 10 can have an effect on the type of colors that are produced by the workpiece 8 with the dichroic painted layer 12 and the primer layer. For example, a flawless cut having a first shape may produce a second color set having the colors cinnabar, dandelion, and teal. But, another flawless cut having a different second shape may produce a second color set having the colors vermilion, gold and olive. Thus, the combination of the dichroic paint layer 12, the primer, and the flawless cuts 10 of the acrylic workpiece 8 can produce the variety of the aforementioned colors thereby modifying the prismatic effect of the workpiece 8.

Figure 10A:
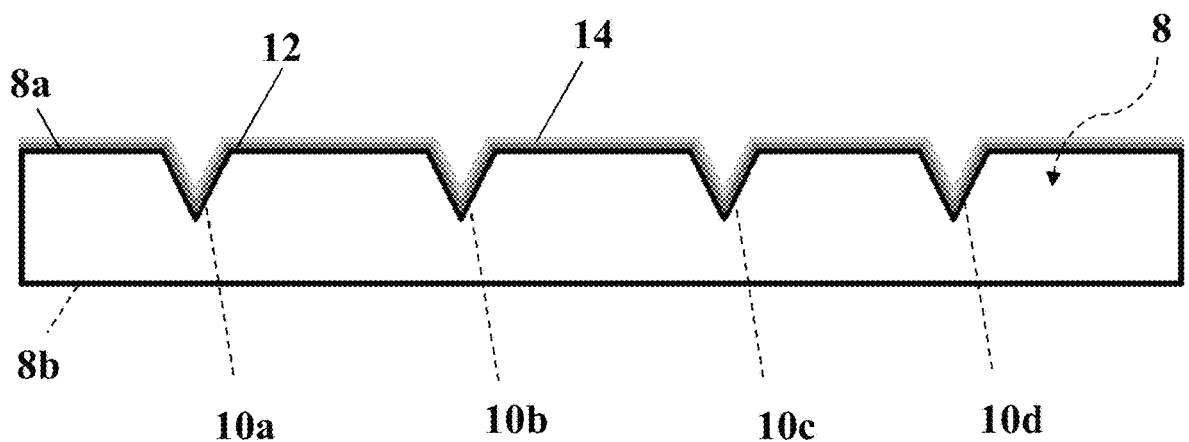
FIG. 10A shows the workpiece of FIG. 9A having a layer of primer applied to and atop the layer of dichroic coating, according to an embodiment.
Figure 10B:
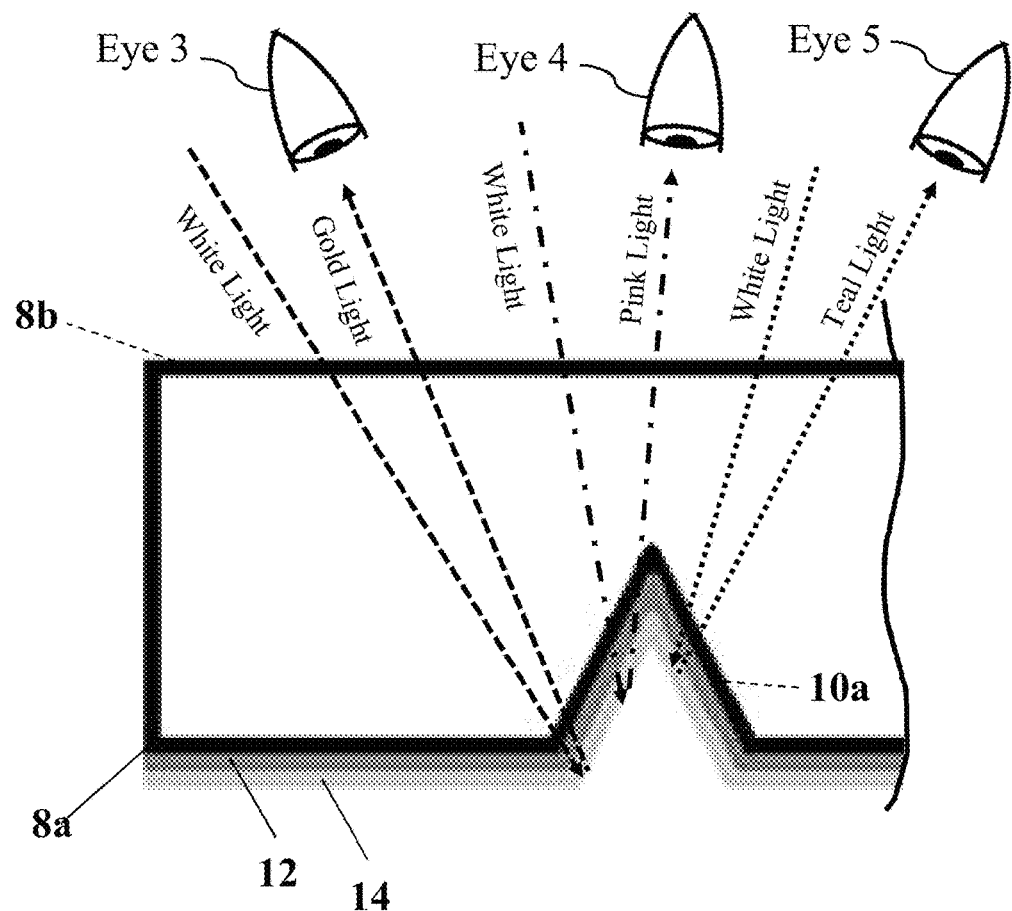
FIG. 10B shows a magnified view of a section of the workpiece in FIG. 10A in which light enters and exits the workpiece.

After the dichroic paint layer 12 is present in the workpiece 8, the primer layer 14 is applied onto the dichroic paint layer 12 to create a primer layer 14 (step S602), as shown in FIGS. 6 and 10A. In this arrangement, the primer layer 14 further modifies the prismatic effect produced by the workpiece 8 and/or the colors produced by the combination of the dichroic paint layer 12 and the flawless cuts 10 of the acrylic workpiece 8. For example, the workpiece 8 may produce or reflect a third color set. Such third distinct color set may include hues, tints or shades of the primary colors or may produce colors that include, but are not limited to, pink, gold, vermilion, cinnabar, dandelion, teal, olive, cerulean, saffron, lavender, cyan, magenta, etc. An example of a portion of the colors in the third color set is reflected in FIG. 10B, which is a magnified view of the workpiece 8 of FIG. 10A. As illustrated in FIG. 10B, white light may enter the flawless cut 10a via the bottom side 8b. As the white light enters the workpiece 8, the white light becomes modified light. Next, the modified light passes through the dichroic coating layer 12 and reaches the primer layer 14. Once the modified light reaches the primer layer 14, the modified light may be reflected, such that the modified light exits the bottom side 8b of the workpiece 8 as one of the colors in the third color set. As such, the color of the light exiting the workpiece 8 (after being reflected by the primer layer 14) is dependent on the angle in which the white light (corresponding to the exiting light) originally entered the workpiece 8. Thus, a person (i.e. viewer) viewing the workpiece 8 from the bottom side 8b may view different colors depending on the angle from which he or she is viewing the bottom side 8b of the workpiece 8. For example, as shown in FIG. 10B, a first viewer having an eye 3 may view, from a first direction (or a first angle), gold light exiting the workpiece 8. Similarly, a second viewer having an eye 4 may view, from a second direction (or a second angle), pink light exiting the workpiece 8. Likewise, a third viewer having an eye 5 may view, from a third direction (or a third angle), teal light exiting the workpiece 8. While, the example shown in FIG. 10B illustrates the dichroic painted-workpiece 8 producing pink light, gold light and teal light, the dichroic painted-workpiece 8 may produce other colors as well. As such, the colors in the third color set may be determined by at least one of the dichroic paint layer 12 and the primer layer 14.

In one exemplary embodiment, the first color set, the second color set, and third color set may include colors that are exclusive to each other, as shown in FIG. 13A. In another exemplary embodiment, there may be at least one color that is present in first color set, the second color set, and third color set and/or a combination thereof, as shown in FIG. 13B. In yet another exemplary embodiment, there may be more colors in the third color set than in the second color set, as shown in FIG. 13C, and vice versa. As such, the combination of the primer 14, the dichroic paint layer 12 and the flawless cuts 10 of the acrylic workpiece 8 can produce the variety of the aforementioned colors thereby modifying the prismatic effect of the workpiece 8. It should be noted that the number of colors in the first, second and third color set may not be same as each other. In other words, for example, the number of the colors in the second set may be greater than the number of colors in the first and/or third color sets.

As stated previously, the direction and/or angle that a person viewing the workpiece 8 also determines the colors that the person sees. For example, as shown in FIG. 13C, a person can view a finished (cut, painted and primed) workpiece from, for example, at least six different directions or angles which can result in the person viewing different colors for each direction or angle. Each of the six directions or angles detailed in FIG. 13C is a different direction or angle from each other. As such, in the example illustrated by FIG. 13C, a person may view the color red when viewing the workpiece from directions 1-3, and yet view the color blue from directions 4-6. After the workpiece has been modified to include a dichroic layer, the person may view the color pink in the $1^{st}$ and $2^{nd}$ directions, the color lavender in the $3^{rd}$, $4^{th}$ and $5^{th}$ directions, and the color magenta in the $6^{th}$ direction. After the workpiece has been modified to also include a primer layer over the dichroic layer, the person may view the color dandelion in the $1^{st}$ direction, the color saffron in the $2^{nd}$ direction, the color cyan in the $3^{rd}$ direction, the color gold in the $4^{th}$ direction, and the color dandelion again in the $5^{th}$ and $6^{th}$ direction. It should be noted that the aforementioned table in FIG. 13C is merely exemplary, and there can be an unlimited combination of any hues and/or colors, directions and/or angles for each for the first, second and third color sets.

Figure 11A:
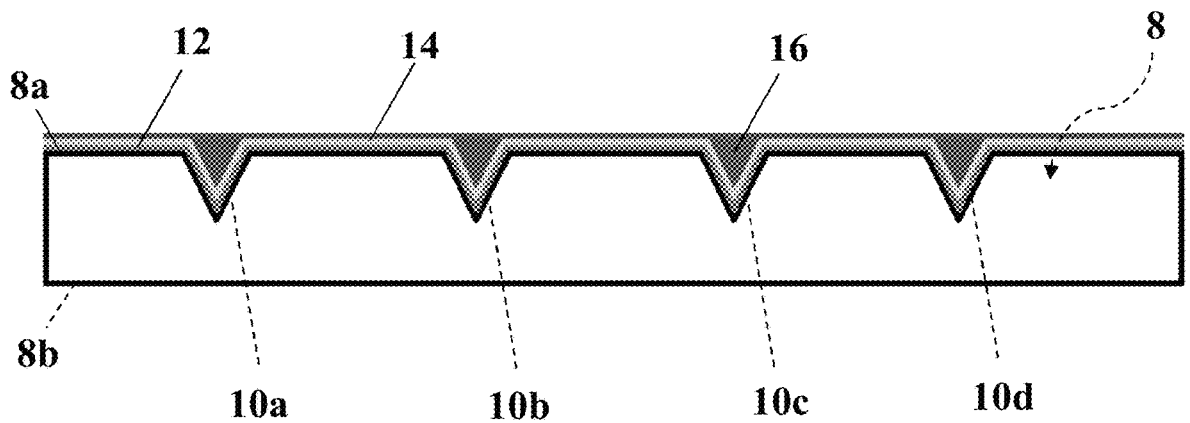
FIG. 11A shows the workpiece of FIG. 10A having a volume of epoxy resin applied to the layer of primer, according to an embodiment, so as to basically fill in the groove in the drilled area of the planar surface to have the same be substantially planar again.
Figure 11B:
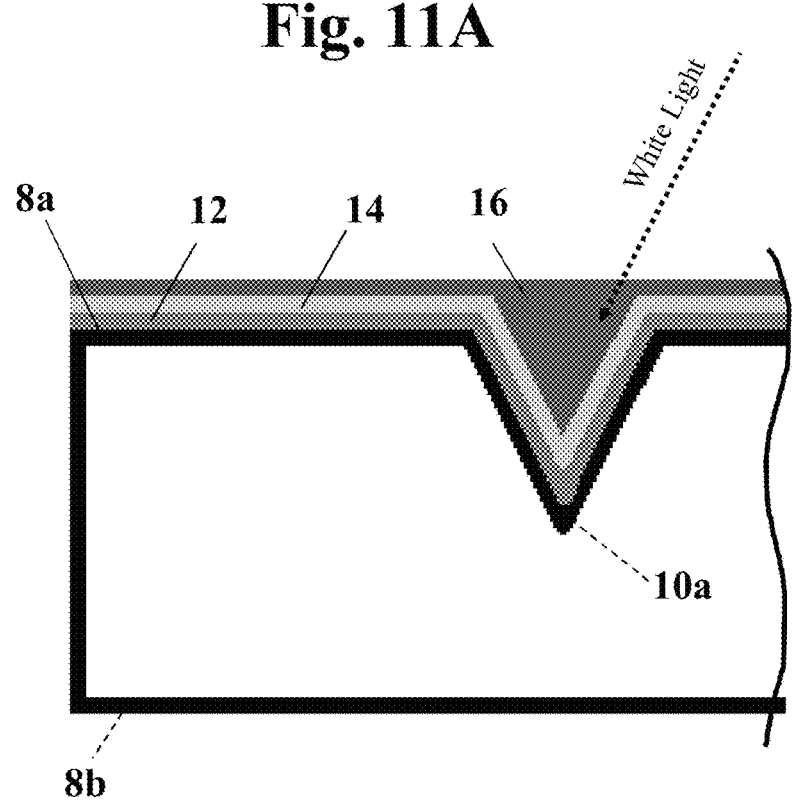
FIG. 11B shows a representative and magnified view of the workpiece in FIG. 11A.

In the case that the workpiece 8 is composed of acrylic, the workpiece 8 performs the function of the clearcoat, and therefore the step of applying the clearcoat becomes unnecessary. In the carved areas where the dichroic paint 12 and the primer 14 are applied, the flawless cuts 10 may not be filled completely. As such, after the primer layer 14 has dried, it is preferred but not essential that epoxy resin 16 be applied to fill in the carved areas to fill the "holes" or flawless cuts 10 (step S603) as shown in FIG. 11A so that the top surface is, once again, substantially planar. The epoxy resin 16 may be transparent. In other words, once the epoxy resin 16 fills a "gap" of the flawless cuts 10, the first side 8a of the workpiece 8 may become substantially flat with no remaining holes or carvings, as illustrated in FIG. 11A. However, it is not necessary to make the workpiece 8 substantially flat and for some end products use of the epoxy resin can be dispensed with. A magnified view of the layers on the workpiece 8 is shown in FIG. 11B. As shown in FIG. 11B, the epoxy resin layer 16 absorbs white light (or any other colored light) entering the workpiece 8 from the topside 8a thereby preventing white light (or any other colored light) from passing through the workpiece 8 and exiting via the bottom side 8b. The epoxy resin layer 16 also performs the function of protecting the dichroic paint 12 and the primer so as to maintain the adhesion of the dichroic paint 12 as well as to prevent any exposed carving of the flawless cuts 10. In addition, the epoxy resin 16 may also be applied to the entirety of the side 8a of the workpiece 8. A highly desirable end product is thus provided.

Figure 12:
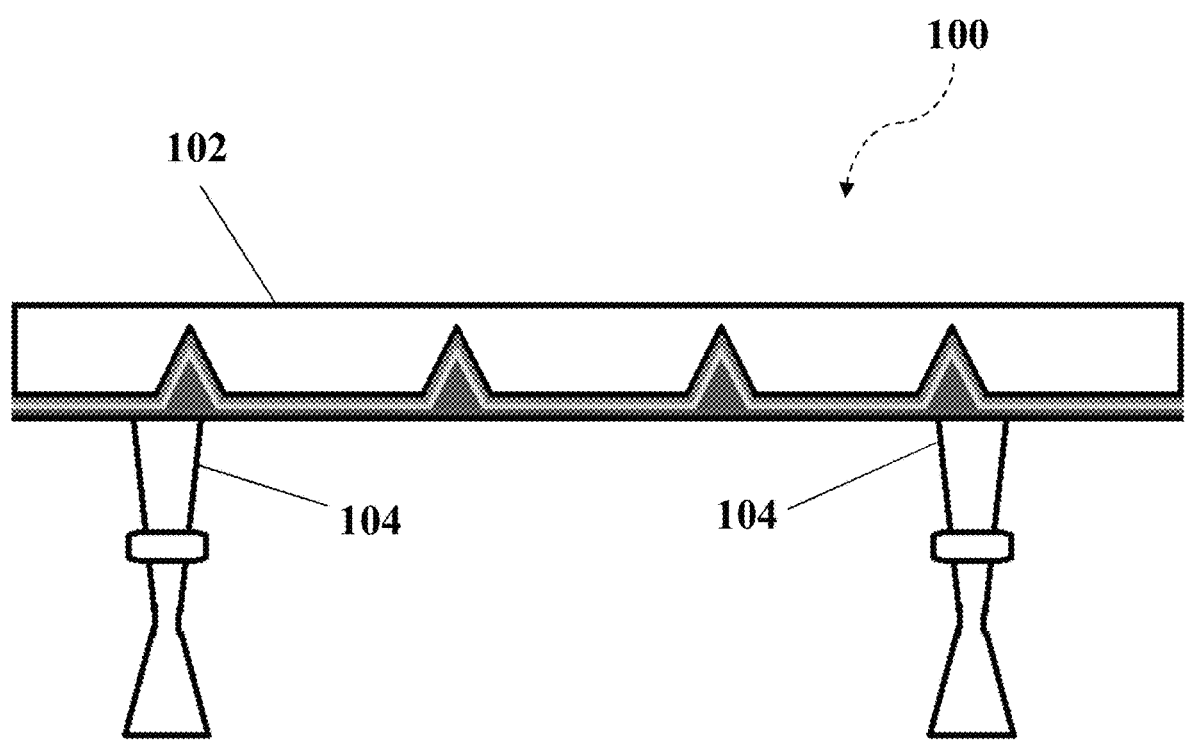
FIG. 12 shows a table made with the surface of the workpiece made according to the present invention, after suitable sanding and finishing both planar surfaces, that is capable of producing a prismatic visual effect, according to an embodiment.

However, after the epoxy resin 16 layer is applied, both the first side 8a and second side 8b of the workpiece 8 may be sanded and polished, preferably, simultaneously (step S604). However, it is not necessary to do the sanding simultaneously nor even to do the sanding/polishing at all. As a result of this configuration, the workpiece 8 can now display more colors when light passes through. In an exemplary and preferred embodiment, the now, cut, painted, primed, resin filled and sanded, i.e., modified workpiece 8 can be used in product such as a household product, like a coffee table, a guitar base, a wing of an automobile, a pair of hand grips, an end table, a dining room table, etc. having a highly distinctive prismatic visual effect. An example of this product is shown in FIG. 12, which illustrates a table 100 having such prismatic visual effect. The table 100 includes a flat top 102 that includes the prismatic visual effect and a plurality of legs 104 that help the table 100 stand stably. It should be noted that in this embodiment, the flat top 102 corresponds to the bottom side 8b of the workpiece 8. In other words, when the table 100 is produced from the workpiece 8, the bottom side 8b becomes the top side (i.e. flat top 102) of the table 100 and the top side 8a becomes the bottom side (i.e. side opposite to that of flat top 102) of the table 100. Consequently, the flat top 102 (i.e. bottom side 8b) is capable of producing colored light, similar to the example shown in FIG. 10B, while the bottom side (i.e. top side 8a) of the table 100 absorbs light, similar to the example shown in FIG. 11B.

The aforementioned specific embodiments are illustrative, and many variations can be introduced on these embodiments without departing from the spirit of the disclosure or from the scope of the appended claims. In addition, elements and/or features of different examples, and illustrative embodiments may be combined with each other and/or substituted for each other within the scope of this disclosure and appended claims.

What is claimed is:

1. A method for creating a prismatic planar surface for an apparatus, the method comprising:
   (a) providing a cast acrylic workpiece having a first planar surface and a second planar surface, said second planar surface being substantially parallel to said first planar surface;
   (b) carving and/or drilling one or more portions of the first planar surface so as to create one or more flawless cuts configured to display a first prismatic visual effect, said carving and/or drilling being performed with a drill bit of a high speed drill of a computer numerical control device;
   (c) coating said flawless cuts with a layer of dichroic paint such that the layer of dichroic paint is in direct contact with the flawless cuts of the cast acrylic workpiece;
   (d) coating said layer of dichroic paint with a layer of primer such that the layer of primer is in direct contact with the layer of dichroic paint to thereby produce a second prismatic visual effect showing a first distinct set of colors when said second planar surface is viewed from a first viewing angle and a second and distinct set of colors when said second planar surface is viewed from a second viewing angle; and
   (e) filling in voids of said flawless cuts entirely with an epoxy resin such that the epoxy resin is in direct contact with the layer of primer, absorbs light, and prevents said light from passing through the cast acrylic workpiece and exiting through the second planar surface of the cast acrylic workpiece.

2. The method according to claim 1, further comprising:
   (f) polishing at least one of the first planar surface and the second planar surface of the cast acrylic workpiece.

3. The method according to claim 1, wherein the one or more flawless cuts includes a V-shaped cross-section.

4. The method according to claim 1, wherein the one or more flawless cuts includes a U-shaped cross-section.

5. The method according to claim 1, wherein the one or more flawless cuts includes a square-shaped cross-section.

6. The method according to claim 1, wherein the cast acrylic workpiece is initially substantially transparent and flat.

7. A prismatic end product prepared by a method comprising the steps of:
   (a) providing a cast acrylic workpiece having a first planar surface and a second planar surface, said second planar surface being substantially parallel to said first planar surface;
   (b) carving and/or drilling one or more portions of the first planar surface so as to create one or more flawless cuts configured to display a first prismatic visual effect, said carving and/or drilling being performed with a drill bit of a high speed drill of a computer numerical control device;
   (c) applying a layer of dichroic paint to the flawless cuts formed into said first planar surface such that the layer of dichroic paint is in direct contact with the flawless cuts of the cast acrylic workpiece;
   (d) applying a layer of primer to the layer of dichroic paint such that the layer of primer is in direct contact with the layer of dichroic paint to create a second prismatic visual effect of the cast acrylic workpiece showing a first distinct set of colors when said second planar surface is viewed from a first viewing angle and a second and distinct set of colors when said second planar surface is viewed from a second viewing angle; and
   (e) filling in voids of said flawless cuts entirely with an epoxy resin such that the epoxy resin is in direct contact with the layer of primer, absorbs light, and prevents said light from passing through the cast acrylic workpiece and exiting through the second planar surface of the cast acrylic workpiece;
   wherein the prismatic end product includes the cast acrylic workpiece having the one or more flawless cuts, the layer of dichroic paint being in direct contact with the flawless cuts of the cast acrylic workpiece, the layer of primer being in direct contact with the layer of dichroic paint, and the epoxy resin being in direct contact with the layer of primer.

8. The prismatic end product prepared by the method according to claim 7 further comprising:
   (f) polishing at least one of the first planar surface and the second planar surface of the cast acrylic workpiece.

9. The prismatic end product prepared by the method according to claim 7, wherein the one or more flawless cuts includes a V-shaped cross-section.

10. The prismatic end product prepared by the method according to claim 7, wherein the one or more flawless cuts includes a U-shaped cross-section.

11. The prismatic end product prepared by the method according to claim 7, wherein the one or more flawless cuts includes a square-shaped cross-section.

12. The prismatic end product prepared by the method according to claim 7, wherein the cast acrylic workpiece is initially substantially transparent and flat.

* * * * *